(12) United States Patent
Ehmann et al.

(10) Patent No.: US 11,942,772 B2
(45) Date of Patent: Mar. 26, 2024

(54) CABLE BUSHING

(71) Applicant: ICOTEK PROJECT GMBH & CO. KG, Mogglingen (DE)

(72) Inventors: Valentin Ehmann, Schwabisch Gmund (DE); Bruno Ehmann, Mogglingen (DE)

(73) Assignee: ICOTEK PROJECT GMBH & CO. KG, Mogglingen (DE)

( * ) Notice: Subject to any disclaimer, the term of this patent is extended or adjusted under 35 U.S.C. 154(b) by 219 days.

(21) Appl. No.: 17/289,791

(22) PCT Filed: Oct. 24, 2019

(86) PCT No.: PCT/EP2019/079039
§ 371 (c)(1),
(2) Date: Apr. 29, 2021

(87) PCT Pub. No.: WO2020/089031
PCT Pub. Date: May 7, 2020

(65) Prior Publication Data
US 2021/0399537 A1    Dec. 23, 2021

(30) Foreign Application Priority Data
Oct. 29, 2018   (DE) .................. 10 2018 218 426

(51) Int. Cl.
*H02G 3/22*   (2006.01)
(52) U.S. Cl.
CPC ..................................... *H02G 3/22* (2013.01)
(58) Field of Classification Search
CPC .. H02G 3/22; H02G 3/24; H02G 3/26; H02G 3/30; H02G 3/36; H02G 15/007; H02G 15/04; H02G 3/083; H02B 1/305; F16L 5/10; F16L 5/14; B60R 16/0222; B60R 16/0215
(Continued)

(56) References Cited

U.S. PATENT DOCUMENTS 4,702,444 A * 10/1987 Beele ..................... F16L 5/14
                                                    174/151
4,919,372 A *  4/1990 Twist ..................... H02G 3/22
                                                    248/68.1
(Continued)

FOREIGN PATENT DOCUMENTS

DE   102014016890   5/2016
EP       2614563    7/2013
(Continued)

OTHER PUBLICATIONS

International Preliminary Report on Patentability received for PCT Patent Application No. PCT/EP2019/079039, dated May 14, 2021, 16 pages (10 pages of English Translation and 6 pages of Original Document).
(Continued)

*Primary Examiner* — Angel R Estrada
(74) *Attorney, Agent, or Firm* — Faegre Drinker Biddle & Reath LLP

(57) ABSTRACT

A cable bushing includes a frame having at least one space for receiving at least one resilient cable grommet, and which has at least one first and one second frame part, as well as a clamping lever which may be rotatably movably connected to the first frame part and is movable between an open position and a closed position. The frame parts are braced against one another in a bracing direction in the closed position of the clamping lever.

19 Claims, 5 Drawing Sheets

(58) Field of Classification Search
USPC ........ 174/656, 151, 650, 135, 152 G, 153 G, 174/152 R, 659, 664, 137, 155, 156; 248/74.1, 74.2, 68.1, 65, 49, 56, 74.3; 16/2.1, 2.2
See application file for complete search history.

(56) References Cited

U.S. PATENT DOCUMENTS

| | | | | |
|---|---|---|---|---|
| 5,108,060 | A * | 4/1992 | Beele | F16L 5/14 248/56 |
| 7,288,730 | B2 * | 10/2007 | Habel | H02G 3/22 174/152 G |
| 8,963,010 | B2 * | 2/2015 | Sprenger | H02G 3/083 174/152 G |
| 9,350,152 | B2 * | 5/2016 | Andresen | H01R 43/20 |
| 9,496,692 | B2 | 11/2016 | Sprenger et al. | |

FOREIGN PATENT DOCUMENTS

| | | |
|---|---|---|
| EP | 2746634 | 6/2014 |
| EP | 2916409 | 9/2015 |
| WO | 2018189182 | 10/2018 |

OTHER PUBLICATIONS

International Search Report and Written Opinion received for PCT Patent Application No. PCT/EP2019/079039, dated Jan. 9, 2020, 19 pages (9 pages of English Translation and 10 pages of Original Document).

* cited by examiner

CABLE BUSHING

CROSS-REFERENCE TO RELATED APPLICATIONS

The present application is a 371 U.S. National Stage Application of International Application No. PCT/EP2019/079039, filed Oct. 24, 2019, which claims priority to DE 10 2018 218 426.7, filed Oct. 29, 2018, the disclosures of which are hereby expressly incorporated herein by reference.

BACKGROUND/SUMMARY

The present disclosure relates to a cable bushing comprising a frame, which comprises at least one space for receiving at least one resilient cable grommet, of the type specified in greater detail in the preamble of claim 1.

Cable bushings comprising resilient cable grommets, which are constructed to have a slit, in order to thus receive prefabricated cables comprising connectors or the like, are known from the prior art in this respect. The frame, which receives one or more of the cable grommets, comprises at least two frame parts. According to the prior art, these are typically screwed together or, in cases in which a high level of sealing against dust and in particular water is not required, are optionally also latched together.

In practice, in particular in cable bushings which are accordingly constructed to be sealed, it is generally standard to assemble said bushings by screwing the frame parts together. This is, however, relatively complex and requires an accordingly long assembly time. This consequently increases the assembly complexity and therefore also the costs incurred by the assembly.

The generic European patent EP 2 614 563 B1 discloses a construction which remedies this problem by describing interlocking two identically constructed frame parts by means of a sliding element. Similarly to being latched together, although it is possible to very rapidly assemble this construction, the forces required for a high sealing effect are typically not applied to the resilient cable grommets. The alternative solution comprising at least one clamping bracket closure instead of the sliding element is better with regard to the forces to be implemented; however, the construction comprising the clamping bracket closure has the drawback that a clamping bracket closure is relatively complex in terms of the production and assembly of the clamping bracket closure itself. Another severe drawback, relating to the sealing effect, comes from the principle of the clamping bracket closure. The clamping bracket closure requires a dead centre to be passed for secure fixation. More stress is therefore built up than ultimately acts on the braced frame parts and the resilient cable grommets positioned therein. A part of the clamping bracket is then hooked behind a projection and the pressure on the construction is relieved again to some extent by the resilience of the cable grommets. During this resetting, the cable grommets pull the clamping lever into the depression, so to speak, and thus ensure that the clamping bracket is securely retained. If, however, a high level of sealing is intended to be produced, it is precisely this that is a crucial drawback. In practice, loading the cable grommets beyond the tension that is later required specifically results in them being seated to a minimal extent and the sealing then no longer being completely provided due to the "overstressing" of the resilient cable grommets at the upper dead-centre position in the actual closed position due to the pressure being relieved to a minimal extent.

The problem addressed by the present disclosure is then to develop a cable bushing of the type specified in the preamble of claim 1 such that a very good sealing effect can be achieved together with simple assembly.

According to the disclosure, this object is achieved by a cable bushing having the features of claim 1, and in particular of the characterising part of claim 1. Advantageous embodiments and developments of the cable bushing result from the dependent sub-claims.

The cable bushing according to the disclosure comprises two frame parts, which in turn may be formed in multiple parts and for example may have dividers that are rigidly or detachably connected to the frame part in order to define a plurality of receiving spaces for a plurality of cable grommets. These two frame parts are then braced against the resilient cable grommets placed therein, and the cables or blind plugs received therein, by means of a clamping lever in a bracing direction. According to the disclosure, the clamping lever, or the second frame part, i.e. the frame part to which the clamping lever is not rotatably movably connected, comprises a guide surface. The second frame part, or accordingly the clamping lever, depending on which of the elements takes on which function, comprises a sliding edge, which can also be implemented in the form of individual sliding points, a sliding surface, or the like. For example, if there are two L-shaped frame parts, it is also conceivable for each of the frame parts to take on both functions, i.e. one clamping lever is rotatably movably connected to one frame part at the top right and another clamping lever is rotatably movably connected to the other frame part at the bottom left.

The sliding edge moves along the guide surface as the clamping lever moves into its closed position. In this case, the guide surface extends obliquely relative to the closure direction, for example in the form of a slanted plane or preferably in the form of a curved plane. By means of this guide surface extending obliquely relative to the closure direction and the sliding edge that slides on the guide surface, both said guide surface and said sliding edge then move and therefore the frame parts move towards one another by means of the rotational movement of the clamping lever about one frame part. By means of the interaction between the guide surface and the sliding edge, the clamping lever pulls the first frame part, so to speak, in the closure direction counter to the other, second frame part and thus braces the resilient cable grommets inserted between the frame parts. The construction is extremely simple and efficient to use, since only the clamping lever needs to be moved. In the process, the forces and paths to be applied decide the shape of the guide surface, such that it can be varied and set according to the required use. Unlike in a clamping bracket closure, a construction can be produced which builds up increasing tension without a point of maximum tension being exceeded. Therefore, an extremely well-sealed construction of the cable bushing can be achieved after assembly.

Therefore, according to an advantageous development of the cable bushing, it may be provided that the slope of the guide surface flattens out as the clamping lever moves closer towards its closed position, such that the frame parts can be moved towards one another as the path becomes shorter, depending on the angular section of the rotation of the clamping lever. The movement can thus be carried out over the guide surface such that a relatively long path is produced at the start, since the counter-forces of the resilient cable grommets are still relatively low. In this situation, rapid bracing can be implemented by the long path. Towards the end, when the counter-forces of the resilient cable grommets are accordingly greater, an accordingly shorter path can be produced, such that in particular greater bracing forces can be applied here.

In this connection, an absolutely crucial advantage is provided by the following variant of the cable bushing according to the disclosure, in which, between the clamping lever and the second frame part, in addition to the first guide surface and the first sliding edge, another second guide surface and second sliding edge are formed, which come into engagement at least partially after the first guide surface and the first sliding edge when the clamping lever moves into its closed position. In this connection, "come into engagement" means that they transmit forces. There may have also already been contact, in particular in the case of a relatively resilient guide surface.

The construction then makes it possible, for example by means of the first guide surface and the first sliding edge, for a relatively long path to be produced with a relatively low tensile force, and for a shorter path to be produced, depending on the angle of the clamping lever, by suitably arranging the second guide surface and the second sliding edge towards the end of the movement of the clamping lever towards its closed position, for example, but in the process accordingly allows greater forces to be applied in order to achieve both rapid closing and also a high bracing force that assists the sealing.

According to a particularly favourable development thereof, it may thus be provided that the first guide surface has a greater distance from the fulcrum of the clamping lever about the first frame part than the second guide surface. The clamping lever is typically always actuated at the maximum lever length. In practice, the actuation therefore takes place such that the side of the clamping lever remote from the fulcrum is pushed towards the relevant frame part. For example, the first guide surface may therefore be a relatively large distance from the fulcrum in this region. It is therefore approximately in the region of the action of force that typically occurs. Therefore, there is virtually no lever stroke between the applied force during assembly and the position of the first guide surface and first sliding edge. It can therefore substantially be operated by the force exerted by the worker, who closes the cable bushing by actuating the clamping lever. The second guide surface and accordingly the second sliding edge are then at a shorter distance from the fulcrum between the clamping lever and the second frame part. When the force exerted on the clamping lever remains unchanged, this results in a lever stroke which accordingly intensifies the force applied by the worker. In the above-described embodiment, in this case, the lever stroke corresponds to the difference between the distance of the first guide surface from the fulcrum and the distance of the second guide surface from the fulcrum. If this lever stroke is selected to be accordingly long, a relatively high force can be applied to the cable grommets in the bracing direction without a greater amount of force needing to be applied during assembly, and this further improves the quality of the sealing.

According to a very advantageous development of this concept having the two guide surfaces, it may further be provided that the first guide surface comprises a recess in the region of contact with the first sliding edge at the end of the movement of the clamping lever into the closed position. At the end of the movement of the clamping lever into its closed position and therefore at the end of the movement of the first frame part relative to the second frame part in the bracing direction, the recess then causes the first guide surface and the first sliding edge to no longer be in engagement and therefore accordingly to no longer transmit forces.

This is particularly useful when, according to an advantageous configuration of this concept, it is provided that the recess is designed such that, based on the first sliding edge, it begins once the second sliding edge has come into engagement with the second guide surface when the clamping lever moves into its closed position. If, therefore, two of the guide surfaces and sliding edges are then provided, a kind of "distribution of tasks" can be implemented via the recess. For example, the first guide surface can initially be in engagement with the first sliding edge and, in the process, can produce an accordingly longer path with less force. Once the second guide surface, which begins when the second sliding edge comes into engagement only after the clamping lever has already passed over a section of the path, is then in engagement, the first sliding edge can be removed from the first guide surface through the recess. This prevents a statically indeterminate state in which both sliding edges are in engagement. The second guide surface can then be used in cooperation with the second sliding edge in order to produce the maximum tensile force in a shorter path, in particular with greater force, for example by means of a longer lever path.

In principle, a construction would be conceivable which, similarly to the generic prior art, merely has identical frame parts, as already mentioned above. In practice, however, this is rather impractical, since the inserted cables and cable grommets are not automatically held in the frame parts, and therefore the construction is relatively difficult to assemble. In order to achieve simpler assembly, according to an advantageous development of the concept, it may be provided that the first frame part is designed as a lid part having a rotatably movable connection to the at least one clamping lever and the second frame part is designed as a U-shaped frame part comprising two legs. Such a U-shaped frame part comprising two legs can receive the cable grommets between the legs in a clamping manner without them being able to easily fall out. Within the meaning of the present description, the legs are understood to be the two outer legs. Irrespective of this, integral or inserted dividers may be provided, for example in order to provide more spaces for receiving cable grommets, in particular if a plurality of individual cable grommets are intended to be positioned beside one another, and this accordingly facilitates the assembly when dividers are used in the U-shaped second frame part.

According to a first variant, the lid can then receive a clamping lever at each of its ends, which lever then lies beside the legs of the second frame part in the closed position. The construction would therefore provide a lid which has a clamping lever both on the right and on the left. The clamping levers, which can be rotatably movably mounted in the lid or can also be connected to the lid in a latching manner by means of a shaft or corresponding projections, are then folded downwards on the right and the left along the second frame part relative to its legs and thus close the frame of the cable bushing. This is very simple to assemble, since the two clamping levers can be simultaneously and identically moved from the top downwards.

In an alternative variant of the disclosure, which would of course also be conceivable with two L-shaped frame parts, it may also be provided that the lid comprises a clamping lever at one of its ends and, at its other end, comprises a projection for mounting and rotatably movably guiding the lid in a corresponding recess in the second frame part, the clamping lever being beside one of the legs of the frame part in the closed position. The construction can therefore also be produced by a lid, which, in the form of a first frame part, is hung in the second frame part and rotatably movably pivoted relative to the second frame part provided with the resilient cable grommets in the manner of a lid of a chest. The free end of the lid then accordingly has the clamping lever, which can be produced according to one or more of the above-described variants. Unlike the construction described immediately above, this construction therefore has one single clamping lever and is thus yet more simple in terms of the construction and manufacturing of the frame.

Irrespective of this configuration of the lid, it is then the case that the bracing direction is intended to be defined in parallel with the legs of the second frame part, regardless of the movement of the lid when it is being fitted by the worker or the movement about a rotational axis between the frame parts, since said bracing direction is ultimately the direction in which the cable grommets are braced, at least at the end of the movement of the clamping lever.

An advantageous configuration of the cable bushing according to the disclosure further provides that the clamping lever comprises at least one central groove along its longest extension, into which groove at least one projection of the leg of the second frame part projects in the closed position of the clamping lever, or vice versa. Such a projection, or a plurality of such projections, which results in a comb-like profile in cross section, which meshes together with projections and grooves, can ideally stabilise the clamping lever in the closed state.

According to a very favourable development of this concept, it may be provided here that the at least one guide surface is formed in the at least one projection, and the at least one sliding edge being formed by a partial narrowed portion of the at least one groove. Such a projection, which for example extends in the manner of a fin transversely to the lead-through direction of the cables through the cable bushing on the leg(s) of the first frame part, is relatively simple to produce, since, for example when the frame part is provided in an injection-moulding process, for example from plastics material or fibre-reinforced plastics material, it can be produced in a simple manner so as to be easy to demould. The clamping lever then comprises a corresponding groove, which engages around this projection of the second frame part in the closed state. By means of a partial narrowed portion of the groove, the sliding edge can thus be formed, for example by two protrusions to the right and the left of the groove, which accordingly interact with the first and/or second guide surface, which are then accordingly attached to the right and the left and are therefore in two parts.

Always in principle, but particularly in the construction just described, it may be provided here that the clamping lever and the second frame part, in particular in the region of the projection, comprise holes extending perpendicularly to the planar extension of the frame, which line up in the closed position of the clamping lever. In the closed position of the clamping lever, such holes which line up then serve in particular to permanently fix this position of the clamping lever. The holes may in particular be holes which are generally commonplace and standard anyway for fastening frames of cable bushings, such that the fully equipped and braced frame is, on one hand, connected to a switchgear cabinet by being screwed for example to the wall of the switchgear cabinet, around an aperture through this wall, and, on the other hand, is secured in the braced position, and therefore in the closed position of the clamping lever.

Additionally or alternatively, it is also conceivable for the clamping lever to be fixed in its closed position relative to the second frame part by a latching hook. A latching hook of this kind can reliably hold the clamping lever in the closed position, such that not only do the frictional forces arising between at least one of the guide surfaces and its sliding edge act as a safeguard, but additional mechanical securing is created by a latching hook in a manner known per se.

An advantageous development of the cable bushing according to the disclosure may further provide that the frame parts comprise orienting projections and corresponding recessed portions in the respectively other frame part, which increasingly interlock during the bracing in the bracing direction, and the frame parts are oriented and secured relative to one another. Such orienting projections or centring projections can therefore achieve a form-fitting connection of the frame parts to one another in the braced state, such that the frame is accordingly planar on its surface, for example, and can consequently be well sealed by a flat seal, for example against the wall of a switchgear cabinet. By means of the orientation, the interaction of the frame parts during the bracing and in the braced state can be achieved in the desired manner and in the desired position, for example of sealing edges, sealing surfaces, and the like.

BRIEF DESCRIPTION OF THE DRAWINGS

Further advantageous configurations of the cable bushing according to the disclosure are found in the embodiments, which are described in greater detail in the following with reference to the drawings, in which.

DETAILED DESCRIPTION

Figure 1:
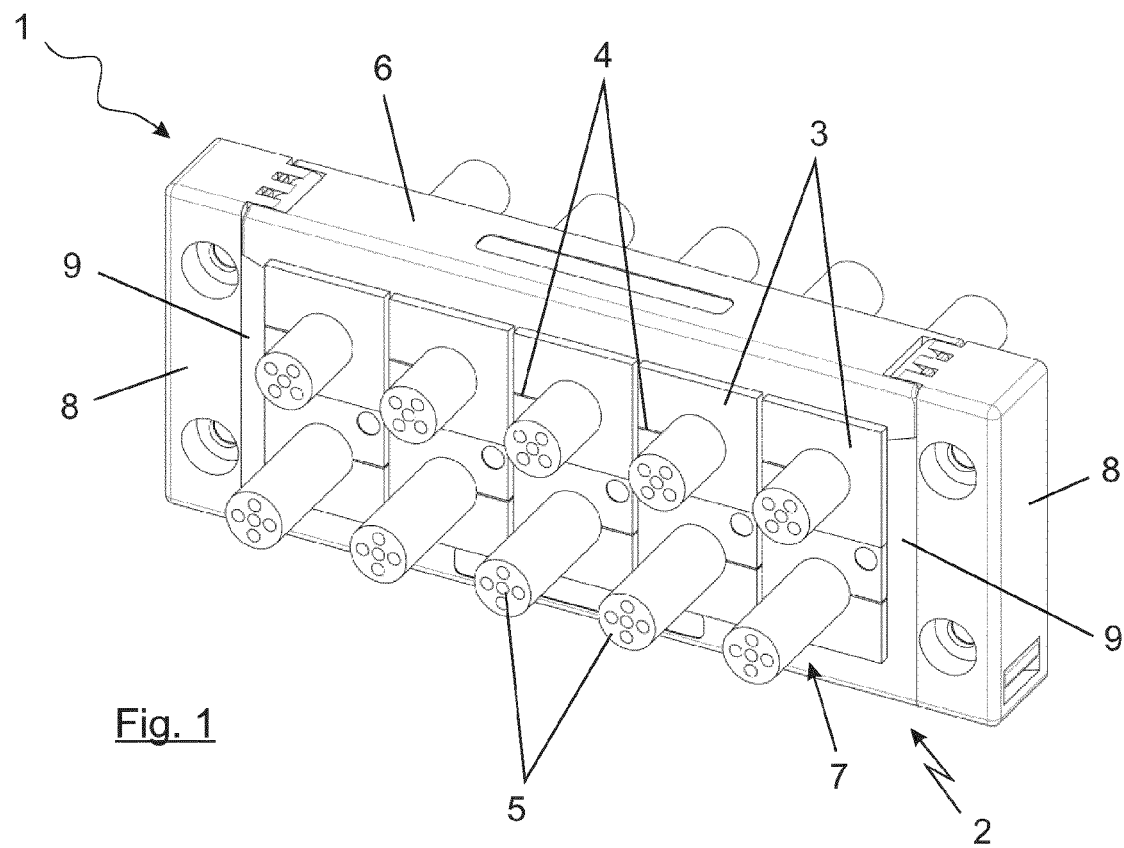
FIG. 1 is a three-dimensional view of a possible embodiment of the cable bushing according to the disclosure comprising resilient cable grommets and cables.

The illustration of FIG. 1 shows a cable bushing 1 of a first embodiment. The three-dimensional view shows a frame 2, in which a plurality of resilient cable grommets 3 are positioned. The cable grommets 3, not all of which are provided with a reference sign, are each provided with a slit 4 in the embodiment shown here, such that they can be opened up in a manner known per se in order to receive prefabricated cables 5 provided with connectors. Some of the cables 5 are shown in part, and not all of the cables 5 are provided with their own reference sign here either. In the embodiment shown here, the frame 2 consists of a first frame part 6, which forms a lid for a second U-shaped frame part 7 here. This shows one clamping lever 8 on the right and one clamping lever on the left of the frame 2 so as to be rotatably movably connected and articulated, respectively, to the first frame part 6, which levers come to rest beside legs 9 of the second frame part 7 in the closed state of the clamping levers 8 shown here. Alternatively, the construction having two L-shaped frame parts would also be conceivable, such that one clamping lever 8 would be rotatably movably connected to one frame part 7 e.g. at the top right and the other clamping lever 8 would be rotatably movably connected to the other frame part 6 at the bottom left.

Figure 2:
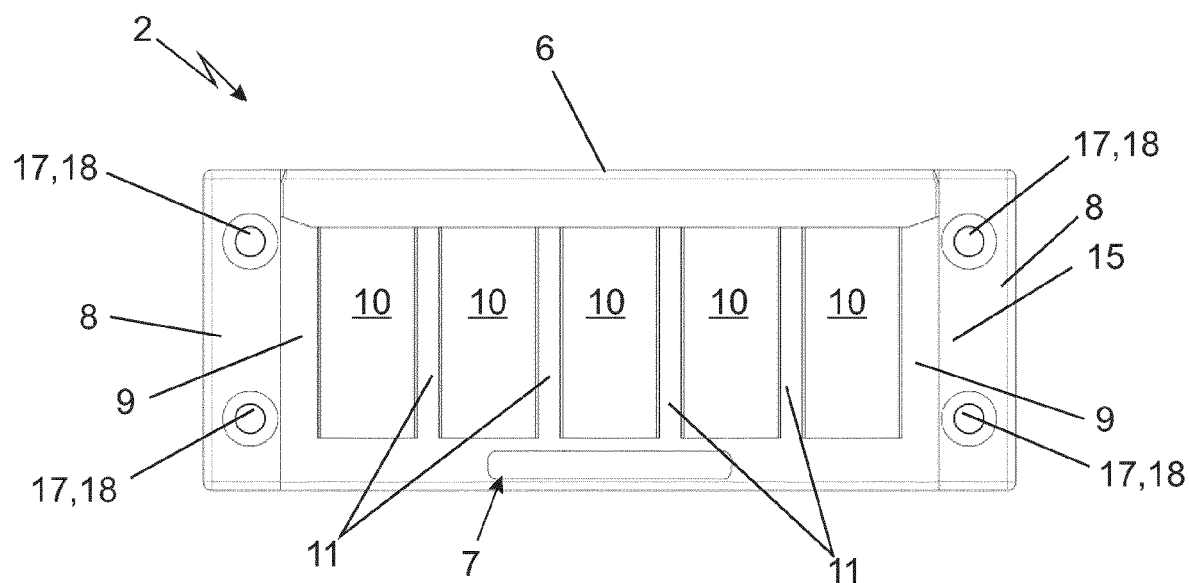
FIG. 2 is a front view of the construction according to FIG. 1.

The view in FIG. 2 is a plan view of the cable bushing 1, again without the resilient cable grommets 3 and the cables 5. For this purpose, spaces 10 for receiving the resilient cable grommets 3 are shown here in the U-shaped second frame part 7. In the view in FIG. 2, the spaces 10 are formed as five equal-sized spaces between the legs 9 of the second frame part 7, purely by way of example. They are optional and, again purely by way of example, are separated from one another by dividers 11. It would be equally conceivable to provide differently sized spaces 10 or just one single space, with it being possible for one or, as shown in the view in FIG. 1, more of the cable grommets 3 to be received in each of the spaces, in particular in the stack direction one on top of the other.

Figure 10:
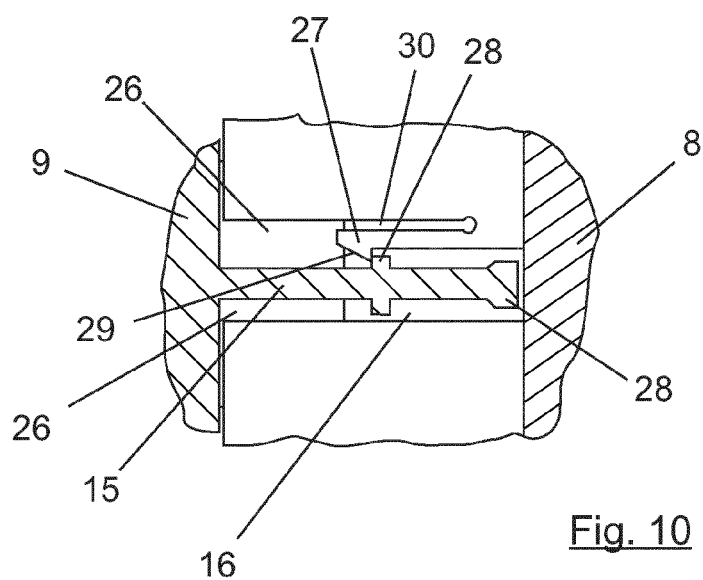
FIG. 10 shows an example of the configuration of a latching hook in a schematic sectional view along line X-X in FIG. 9.

The dividers 11 may be constructed to be fixed to the second frame part or may be connected thereto in a plug-in manner. The crucial functionality of the cable bushing 1 then lies in the use of the clamping levers 8, by means of which the first frame part 6, in this case the lid, can be braced to the second frame part 7 when the resilient cable grommets 3 are inserted. The basic construction is shown in the sectional view in FIG. 3, with the view of the cable grommets 3 being omitted from this figure and all the following figures for the sake of clarity. As shown here in the lower region, the second frame part 7 can be provided in part by a framework structure, in order to obtain a stable but still lightweight connection of the legs 9 by means of a base part 12. The first frame part 6, used as a lid, may in principle also be constructed in this manner, even if it is not shown in this way in the embodiment shown. There are then orienting projections 13, in the second frame part 7 here, and corresponding recessed portions 14, in the first frame part 6 here, between the first frame part 6 and the second frame part 7, such that the frame parts are oriented relative to another during bracing in the bracing direction V indicated here and are mechanically secured in position relative to one another. The clamping levers 8 are each shown in their closed position here, and this will be discussed in greater detail below. They have a corresponding recess in a plane behind the sectional plane in FIG. 3 selected here, i.e. they are provided with a groove into which projections 15 of the legs 9 project. The groove itself is only directly shown in the view in FIG. 10 and is provided with reference sign 16 therein. The construction in which the groove 16 is in the leg 8 and the projection 15 is in the clamping lever 8 and/or which comprises a plurality of grooves 16 and projections 15 that lie beside one another and engage in one another would also be conceivable.

Figure 3:
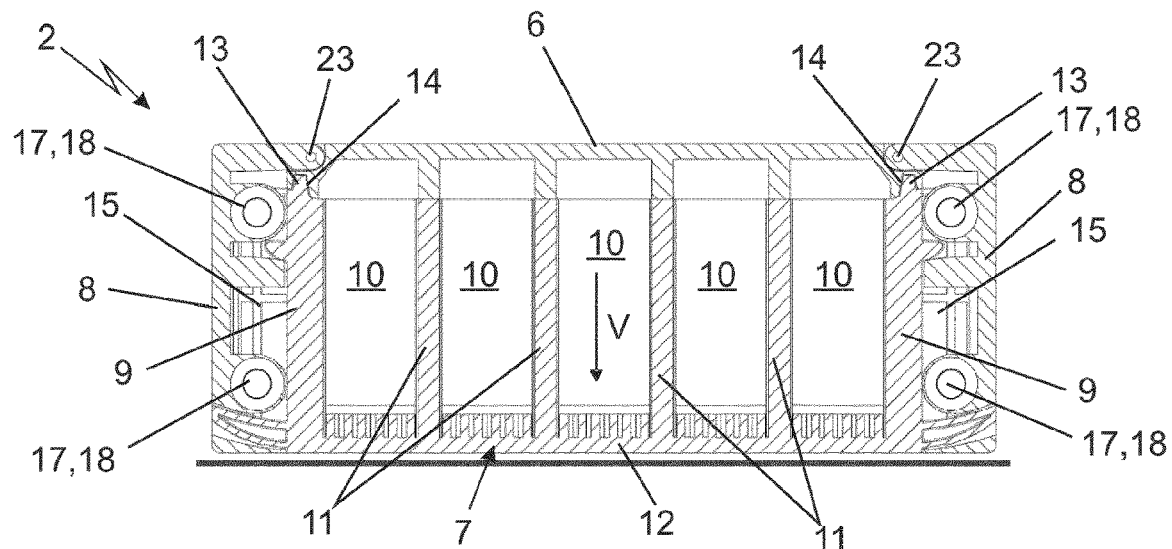
FIG. 3 is a sectional view of the view according to FIG. 2.

During assembly, the two clamping levers 8 then brace the first frame part 6, i.e. the lid, relative to the second frame part 7, i.e. the U-shaped frame part, in which the spaces 10 for the resilient cable grommets 3 are provided. In the variant in FIGS. 1 to 3, two of the clamping levers 8 are shown in each case, such that the construction can be braced equally on the left and the right during assembly, which is carried out simply and efficiently in the manner described in greater detail below. In the braced position and thus in the closed position of the clamping levers 8, as shown in FIGS. 1 to 3, holes 17 in the clamping levers 8 and holes 18 in the legs 9 or in the projections 15 of the legs 9 come into alignment with one another. Screws can be guided through these then congruently aligned holes 17, 18, for example in order to mount the frame 2 of the cable bushing 1 on the wall of a switchgear cabinet around an opening. At the same time, the screws guided through the congruently aligned holes 17, 18 secure the closed position of the clamping levers 8 and thus secure the closed and braced position of the cable bushing 1.

Figure 4:
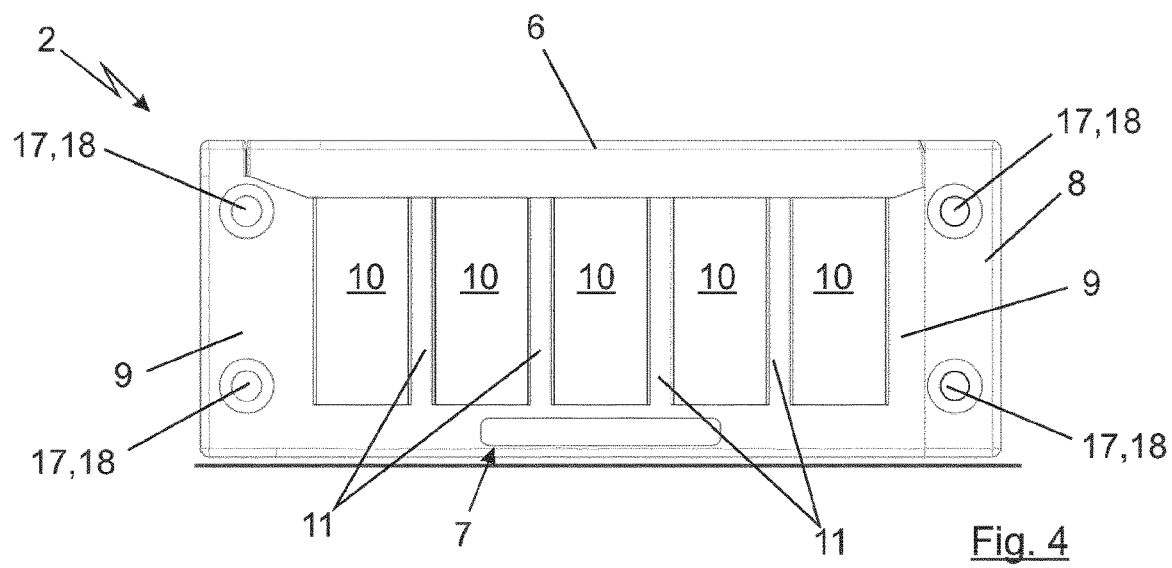
FIG. 4 is a front view of an alternative embodiment of the cable bushing according to the disclosure.
Figure 5:
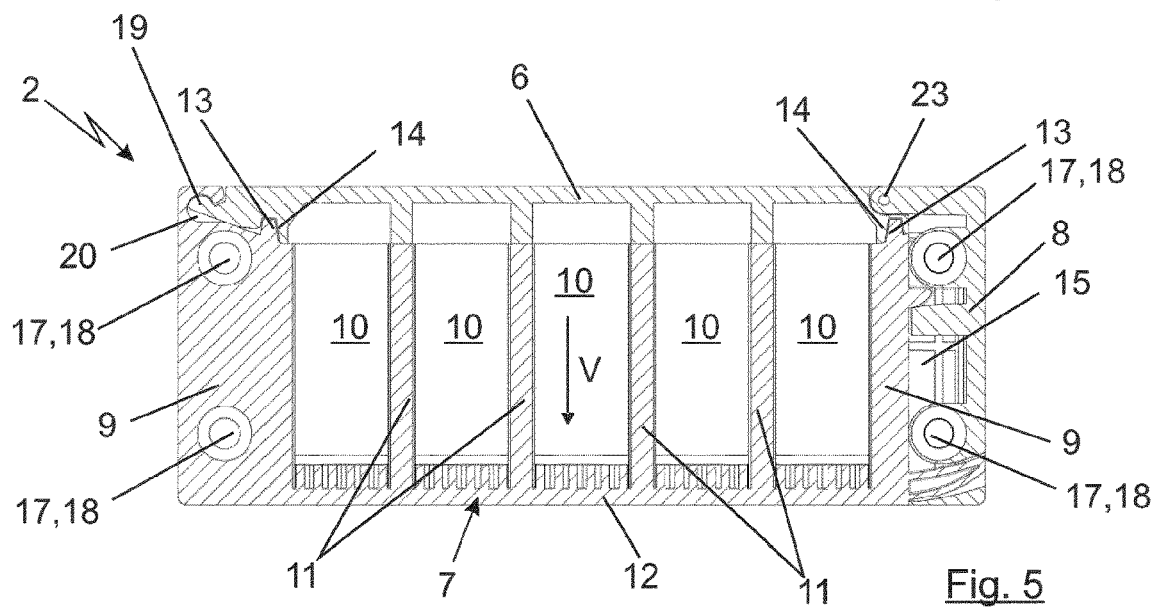
FIG. 5 is a sectional view of the view according to FIG. 4.

FIGS. 4 and 5 then show an alternative variant of the cable bushing 1 or one that is similar to the view of its frame 2 in FIGS. 2 and 3. The construction is substantially similar, but in the embodiment shown here, one of the two clamping levers 8 is omitted on the left-hand side. The left-hand leg 9 of the second U-shaped frame part 7 is accordingly constructed to be wider in order to achieve the same total width and in particular the same distance between the holes 17, 18 on one side and the holes 18 on the other side, as in the above-described exemplary embodiments. The sectional view in FIG. 5 shows the principle. The first frame part 6, used as a lid, comprises a projection 19, which is designed for hanging and rotatably movably guiding the first frame part 6 or lid in a corresponding recess 20 in the second frame part, and in particular the left-hand leg 9 of the second frame part 7 here. The first frame part 6, used as a lid, can therefore be pivoted together with its clamping lever 8, provided that it is still in an open position, in order to thus accordingly close the second frame part 7 with increasing pivoting in the manner of the lid of a chest, the orienting projections 13 and recessed portions 14 also coming into engagement here again in a corresponding manner. The view in FIG. 5 also again shows the final closed position with the clamping lever 8 in the closed position here. This construction can also be accordingly produced with two L-shaped frame parts 6, 7.

In the following figures, in particular the movement of the clamping lever 8 from its open position into its closed position and the mechanisms taking place in the process for bracing the first frame part 6 relative to the second frame part 7 will be discussed. This is described on the basis of a right-hand clamping lever 8 purely by way of example and therefore applies both to the variant in FIGS. 1 to 3 and that in FIGS. 4 and 5. In the variant in FIGS. 1 to 3, the left-hand clamping lever 8 functions in an accordingly similar manner. In this case, the sectional planes in FIGS. 7 and 8 have been selected to be slightly offset from those in FIGS. 6 and 9, in order to thus illustrate the efficient, if again only exemplary, configuration of the rotatably movable reception of the clamping lever 8 on the first frame part 6 in the region of the fulcrum 23. For this purpose, the clamping lever 8 comprises a shaft 31 attached by means of a plurality of connecting pieces 32, which shaft is detachably mounted in a series of rounded teeth 33 of the first frame part 6. In this case, latching to the ends of the shaft 31 is conceivable in order to hold the clamping lever 8 securely on the first frame part 6 even in the disassembled state. The forces are, however, not transmitted via said first frame part but instead via the shaft 31 and the teeth 33, which allows for very high tensile forces owing to the large surface area.

Figure 6:
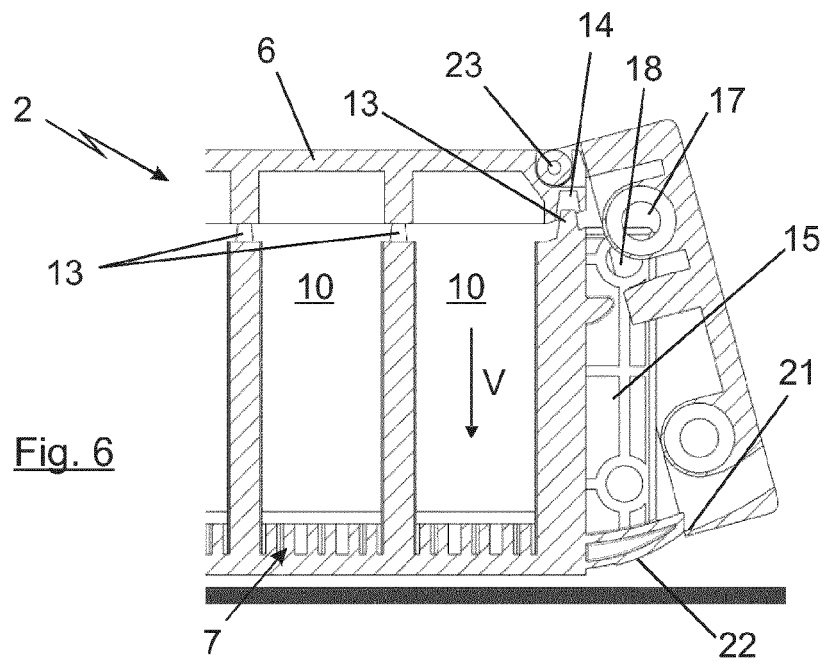
FIG. 6 is a detail of the cable bushing with the clamping lever in an open position.
Figure 7:
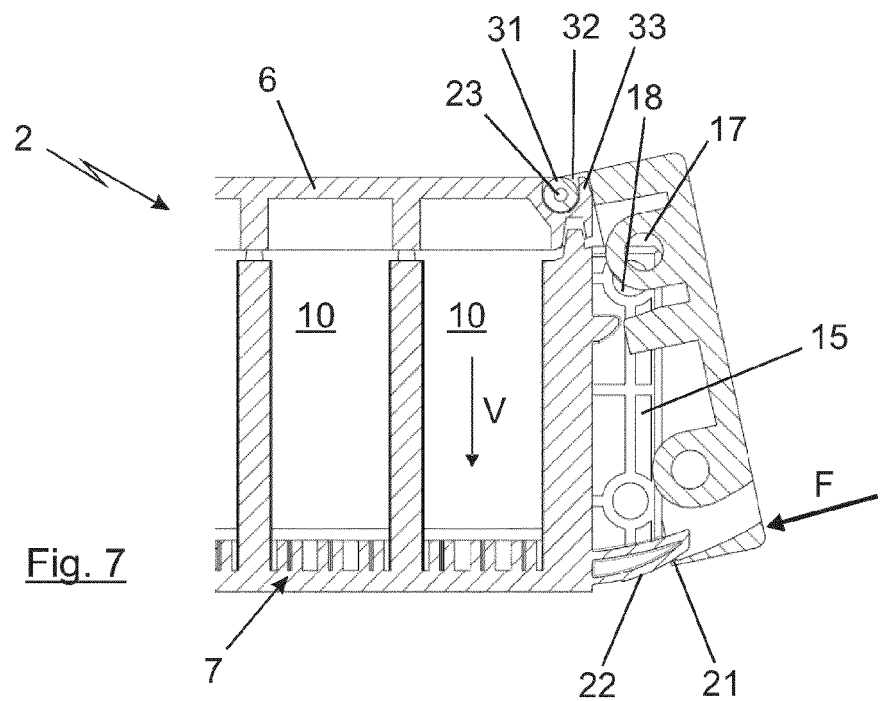
FIG. 7 is a view similar to that in FIG. 6 with the clamping lever in a first intermediate position.

FIG. 6 shows the lid, which has been loosely placed onto the second frame part 7, as the first frame part 6, with the clamping lever 8 still in an open position. In this position, the clamping lever 8 may be loosely positioned beside the leg 9 of the second frame part 7 and the projection 15 thereof. The clamping lever 8 is not yet in engagement with the second frame part 7 or is not yet in considerable engagement therewith. As is important for the function and as can be seen in the view in FIG. 6, the clamping lever 8 comprises a first sliding edge 21 in the form of a relatively small surface projecting into the image plane. This sliding edge 21 of the clamping lever 8 interacts with a first guide surface 22 of the second frame part, which is produced on the leg 9 and in connection with the projection 15 here. In the view in FIG. 7, this can be seen after the clamping lever 8 has pivoted by an angle towards the leg 9. The guide surface 22 is curved here and has an inclined position relative to the bracing direction V of the frame parts 6, 7 relative to one another. The slope begins with a relatively large, steep slope, such that a relatively long path of the first frame part 6 relative to the second frame part 7 is obtained in the first part of the angular path of the clamping lever 8. In this phase, the resilient cable grommets 3, which are not shown but which are arranged in the recesses 10, are still relatively easy to brace, since this is practically the start of their spring characteristic curve. A worker who is pressing on the clamping lever 8 according to the arrow F thus achieves, with relatively low force, a relatively long path along which the first frame part 6 is moved relative to the second frame part 7. Owing to the relatively small angle between the surface of the clamping lever 8 in this position and the vertical, the effective force can be approximately equated with the applied force here, in particular since, depending on the worker in question, the forces are subjected to a different level of force anyway, and therefore the function can approximately be explained with a single indicated force F.

Figure 8:
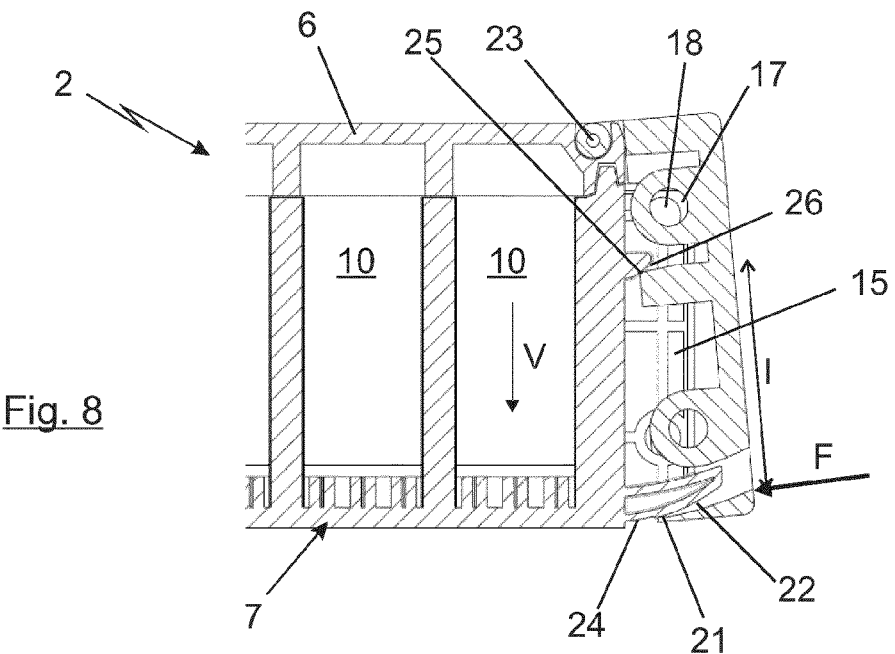
FIG. 8 is a view similar to that in FIG. 6 with the clamping lever in a second intermediate position.

In the view in FIG. 8, the clamping lever 8 is then moved further about its rotary shaft 23 over a further portion of its angular path. The first sliding edge 21 has already slid a long way on the first guide surface 22, and the two frame parts 6, 7 have already clearly moved towards one another. The first sliding edge 21 approaches a recess 24. A short way further along the angular path of the clamping lever 8 than in the view in FIG. 8, the first sliding edge 21 is brought to rest above this recess and therefore is no longer in engagement. For this purpose, as shown in the view in FIG. 8, a second sliding edge 25 is then in engagement with a second guide surface 26. The second guide surface 26 and the second sliding edge 25 each consist of two parts formed to the right and the left of the groove 16 and the projection 15, respectively. In this case, the engagement between the second sliding edge 25 and the second guide surface 26 remains in its closed position shown in FIG. 9 until the end of the movement of the clamping lever 8. In this case, the slope is accordingly lower in particular at the end of the movement of the clamping lever 8 in its closed position at the second guide surface 26, which is likewise oblique relative to the bracing direction V, in order to only provide a short path between the first frame part 6 and the second frame part 7, but to apply a relatively high bracing force in the process. To do this, the distance of the second guide surface 26 and the second sliding edge 25 from the fulcrum 23, about which the clamping lever 8 rotates relative to the first frame part 6, is considerably shorter than that of the first guide surface 22 and the first sliding edge 21, in the region of which the force F acts. The action of the force F in the region of the first guide surface 22 and the first sliding edge 21 is therefore a direct force action, while the action of the equal force F during the engagement of the second sliding edge 25 on the second guide surface 26 is accordingly intensified, since a lever stroke 1 indicated in FIG. 8 is then available for intensifying the action of the force F. This results in very forceful bracing of the resilient cable grommets 3 into the spaces 10. As a result of the second guide surface 26 sloping upwards as far as the closed position of the clamping lever 8, an increasingly great force is applied to the resilient cable grommets 3 until the closed position of the clamping lever 8 is reached without this being relieved again in the meantime. This results in extremely good sealing of the entire cable bushing 1.

Figure 9:
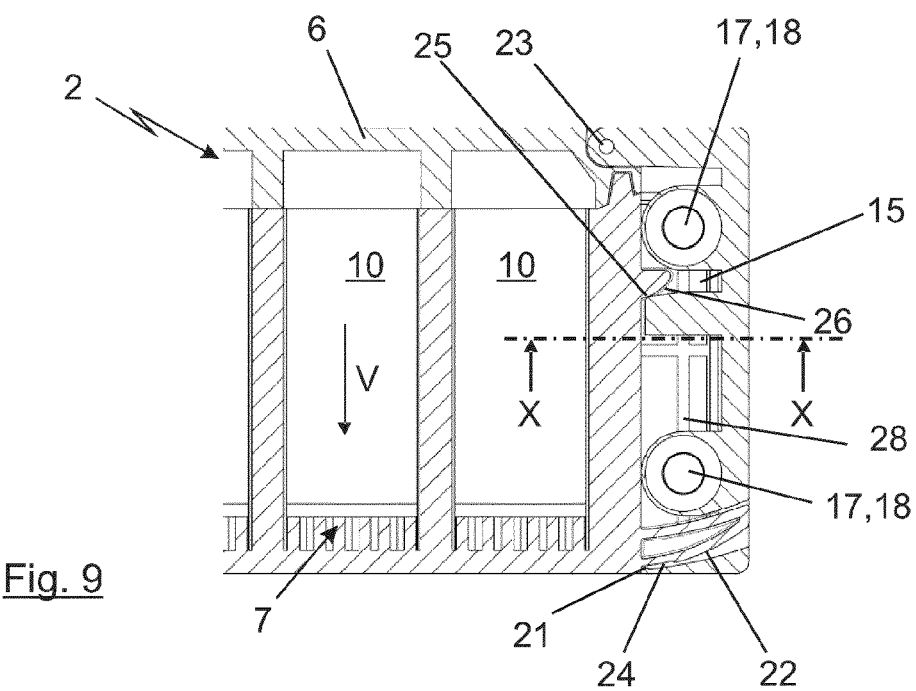
FIG. 9 is a view similar to that in FIG. 6 with the clamping lever in the closed position.

In the closed position of the clamping lever 8 shown in FIG. 9 (similar to FIGS. 3 and 5), the holes 17 in the clamping lever 8 and the holes 18 in the projection 15 of the leg 9 are then congruently aligned one over the other. If screws are then guided through, for example in order to screw the cable bushing 1 to the wall of a switchgear cabinet, the closed position of the clamping lever(s) 8 is secured at the same time and therefore the cable bushing 1 is reliably fixed in its closed and braced position of the frame parts 6, 7.

Alternatively or in particular additionally, a latching hook 27 could also be provided. In the sectional view along line X-X in FIG. 9, which can be seen in FIG. 10, such a latching hook is shown by way of example. The projections 15 comprise ribs 28 as reinforcement. One of these ribs 28 can then for example be used to secure the closed position of the clamping lever 8 by means of the latching hook 27. Purely by way of example, a latching hook 27 of this kind is formed on the part of the clamping lever 8 towards the projection 15 which supports the second sliding edge 25 at its other end. The construction will slide over the rib 28 due to a slant 29 of the latching hook 27 and its resilience achieved by a gap 30 and then accordingly be latched to said rib when the clamping lever 8 has reached its closed position. Additionally or alternatively, latching in the region of the recess 24 is also conceivable.

The invention claimed is:

1. Cable bushing comprising a frame, which comprises at least one space for receiving at least one resilient cable grommet, and which has at least one first and one second frame part, as well as a clamping lever, which is or can be rotatably movably connected to the first frame part and is movable between an open position and a closed position, wherein the frame parts are braced against one another in a bracing direction in the closed position of the clamping lever,
    wherein
    the clamping lever and/or the second frame part comprise a first guide surface and the second frame part and/or the clamping lever comprise a first sliding edge which slides at least temporarily along the first guide surface when the clamping lever moves, wherein the first guide surface extends obliquely relative to the bracing direction such that the frame parts can be moved towards one another when the clamping lever moves into its closed position; and
    wherein between the clamping lever and the second frame part, another second guide surface and second sliding edge are formed, which come into engagement at least partially after the first guide surface and the first sliding edge when the clamping lever moves into its closed position.

2. Cable bushing according to claim 1, wherein the slope of the first guide surface flattens out as the clamping lever moves closer towards its closed position, such that the frame parts can be moved towards one another as the path becomes shorter, depending on the angular section of the rotation of the clamping lever.

3. Cable bushing according to claim 2, wherein between the clamping lever and the second frame part, another second guide surface and second sliding edge are formed, which come into engagement at least partially after the first guide surface and the first sliding edge when the clamping lever moves into its closed position.

4. Cable bushing according to claim 2, wherein the first frame part is designed as a lid having a rotatably movable connection to the at least one clamping lever and the second frame part is designed as a U-shaped frame part with two legs.

5. Cable bushing according to claim 1, wherein the first guide surface has a greater distance from the fulcrum of the clamping lever about the first frame part than the second guide surface.

6. Cable bushing according to claim 5, wherein the first guide surface comprises a recess in the region of contact with the first sliding edge at the end of the movement of the clamping lever into the closed position.

7. Cable bushing according to claim 5, wherein the first frame part is designed as a lid having a rotatably movable connection to the at least one clamping lever and the second frame part is designed as a U-shaped frame part with two legs.

8. Cable bushing according to claim 1, wherein the first guide surface comprises a recess in the region of contact with the first sliding edge at the end of the movement of the clamping lever into the closed position.

9. Cable bushing according to claim 8, wherein the recess is designed such that, based on the first sliding edge, it begins once the second sliding edge has come into engagement with the second guide surface when the clamping lever moves into the closed position.

10. Cable bushing according to claim 8, wherein the first frame part is designed as a lid having a rotatably movable connection to the at least one clamping lever and the second frame part is designed as a U-shaped frame part with two legs.

11. Cable bushing according to claim 1, wherein the first frame part is designed as a lid having a rotatably movable connection to the at least one clamping lever and the second frame part is designed as a U-shaped frame part with two legs.

12. Cable bushing according to claim 11, wherein the lid receives two of the clamping levers at each of its ends, which are beside the legs of the second frame part in the closed position.

13. Cable bushing according to claim 1, wherein the first frame part receives a clamping lever at its one end, and at its other end, comprises a projection for mounting and rotatably movably guiding the first frame part in a corresponding recess of the second frame part, wherein the clamping lever is beside one of the legs of the second frame part in the closed position.

14. Cable bushing according to claim 1, wherein the clamping lever or the corresponding leg of the second frame part comprises at least one central groove along its longest extension, into which groove at least one projection of the leg of the second frame part or the clamping lever projects in the closed position of the clamping lever.

15. Cable bushing according to claim 14, wherein at least one of the guide surfaces is formed in the at least one projection, wherein at least one of the sliding edges is formed by a partial narrowed portion of the at least one groove.

16. Cable bushing according to claim 1, wherein the clamping lever and the second frame part comprise holes perpendicularly to the planar extension of the frame, which line up in the closed position of the clamping lever.

17. Cable bushing according to claim 1, wherein the clamping lever is fixed in its closed position relative to the second frame part by a latching hook.

18. Cable bushing according to claim 1, wherein the frame parts comprise orienting projections and corresponding recessed portions in the respectively other frame part, which increasingly interlock during the bracing in the bracing direction, and the frame parts are oriented and secured relative to one another.

19. Cable bushing according to claim 1, wherein the first frame part is designed as a lid having a rotatably movable connection to the at least one clamping lever and the second frame part is designed as a U-shaped frame part with two legs.

* * * * *